United States Patent
Kim et al.

(10) Patent No.: US 9,600,802 B2
(45) Date of Patent: Mar. 21, 2017

(54) METHOD AND APPARATUS FOR INTELLIGENCE-ORIENTED SERVICE USING CONTEXT INFORMATION ESTIMATION IN MOBILE TERMINAL

(75) Inventors: Nam-Hoon Kim, Suwon-si (KR); Mu-Hong Byun, Suwon-si (KR); Dong-Man Lee, Daejeon (KR); In-Suk Park, Daejeon (KR); Soon-Joo Hyun, Daejeon (KR)

(73) Assignees: SAMSUNG ELECTRONICS CO., LTD, Suwon-si, Gyeonggi-Do (KR); KOREA ADVANCED INSTITUTE OF SCIENCE AND TECHNOLOGY, Yuseong-Gu, Daejeon (KR)

( * ) Notice: Subject to any disclaimer, the term of this patent is extended or adjusted under 35 U.S.C. 154(b) by 0 days.

(21) Appl. No.: 13/508,007

(22) PCT Filed: Oct. 25, 2010

(86) PCT No.: PCT/KR2010/007334
§ 371 (c)(1),
(2), (4) Date: May 3, 2012

(87) PCT Pub. No.: WO2011/055925
PCT Pub. Date: May 12, 2011

(65) Prior Publication Data
US 2013/0007766 A1  Jan. 3, 2013

(30) Foreign Application Priority Data
Nov. 3, 2009  (KR) .................. 10-2009-0105318

(51) Int. Cl.
G06F 9/54     (2006.01)
G06Q 10/10    (2012.01)
G06F 17/22    (2006.01)

(52) U.S. Cl.
CPC .............. *G06Q 10/10* (2013.01); *G06F 9/54* (2013.01)

(58) Field of Classification Search
None
See application file for complete search history.

(56) References Cited

U.S. PATENT DOCUMENTS

| 7,627,098 B2 | 12/2009 | Baik et al. |
| 2004/0235384 A1* | 11/2004 | Reich ................. G06F 8/34 445/24 |

(Continued)

FOREIGN PATENT DOCUMENTS

| KR | 10-0432626 | 5/2004 |
| KR | 10-2004-0107131 | 12/2004 |

(Continued)

OTHER PUBLICATIONS

Karen Henricksen 2005 "Developing Context—Aware persuasive Computing Application Models and Approach"; p. 1-32.*

(Continued)

*Primary Examiner* — Brian W Wathen
*Assistant Examiner* — Abdou Seye

(57) ABSTRACT

A method and an apparatus for providing an intelligence-oriented service using context information estimation in a mobile terminal are provided. In the method, a correlation relation between a low level context variable and a high level context variable is registered. The low level context variable is obtained from at least one data stored in the mobile terminal. The high level context variable is generated using at least one low level context variable. The high level context variable is provided to an upper application.

17 Claims, 3 Drawing Sheets

(56) References Cited

U.S. PATENT DOCUMENTS

2006/0140205 A1    6/2006  Baik et al.
2006/0234758 A1   10/2006  Parupudi et al.
2009/0115600 A1*   5/2009  Lee et al. ............... 340/539.11

FOREIGN PATENT DOCUMENTS

| KR | 10-2005-0072982 | | 7/2005 |
|---|---|---|---|
| KR | 10-2006-0063326 | | 6/2006 |
| KR | 10-0622303 | B1 | 9/2006 |
| KR | 10-2008-0096614 | | 10/2008 |
| KR | 10-2008-0096614 | A | 10/2008 |
| KR | 10-2009-0039425 | | 4/2009 |
| KR | 20090039425 | A * | 4/2009 |
| KR | 10-2009-0053069 | | 5/2009 |

OTHER PUBLICATIONS

Guanling Chen et al , 2002 "context Aggregation and Dissemination in Ubiquious Computing Systems"; p. 1-10.*
Hae-Sun Jung et al 2008 discloses "An Intelligent Ubiquitous Middleware for U-City: SmartUM"; p. 375-388.*
Huadong Wu ( "sensor data fusion for context-aware computing using dempster-shafer theory"), Dec. 2003, pp. 1-189.*
English translation of Korean Foreign document (KR20090039425 A).*
Huadong Wu "Sensor fusion using Dempster-Shafer theory [for context-aware HCI]" pp. 71-76 and pp. 88-90.*
International SearchReport dated Jun. 23, 2011 in connection with International Patent Application No. PCT/KR2010/007334.
Written Opinion of International Searching Authority dated Jun. 23, 2011 in connection with International Patent Application No. PCT/KR2010/007334.
Extended European Search Report dated Oct. 8, 2014 in connection with European Patent Application No. 10828460.5; 8 pages.
First Office Action dated Sep. 3, 2014 in connection with Chinese Patent Applicatoin No. 2010800481853; 11 pages.
Huadong Wu, "Sensor Data Fusion for Context-Aware Computing Using Dempster-Shafer Theory" The Robotics Institute, Carnegie Mellon University, Pittsburgh, PA, Dec. 2003.
Office Action dated May 15, 2015 in connection with Chinese Application No. 2010800481853, 11 pages.
Chinese Office Action dated Dec. 10, 2015 in connection with Chinese Application 201080048153; 7 pages.
Korean Office Action dated Oct. 12, 2015 in connection with Korean Application No. 10-2009-0105318, 10 pages.
Rejection Decision dated Jun. 15, 2016 in connection with Chinese Application 201080048153; 10 pages.
Notice of Final Rejection dated Apr. 20, 2016 in connection with Korean Application No. 10-2009-0105318, 6 pages.
State Intellectual Property Office of the P.R.C., "Notification of Re-Examination," Chinese Patent Application No. 2010800481853, Jan. 3, 2017, publisher SIPO, Beijing Shi, China.

* cited by examiner

METHOD AND APPARATUS FOR INTELLIGENCE-ORIENTED SERVICE USING CONTEXT INFORMATION ESTIMATION IN MOBILE TERMINAL

CROSS-REFERENCE TO RELATED APPLICATION(S)

The present application claims priority under 35 U.S.C. §365 to International Patent Application No. PCT/KR2010/007334 filed Oct. 25, 2010, entitled "METHOD AND APPARATUS FOR INTELLIGENCE-ORIENTED SERVICE USING CONTEXT INFORMATION ESTIMATION IN MOBILE TERMINAL". International Patent Application No. PCT/KR2010/007334 claims priority under 35 U.S.C. §365 and/or 35 U.S.C. §119(a) to Korean Patent Application No. 10-2009-0105318.3 filed Nov. 3, 2009 and which are incorporated herein by reference into the present disclosure as if fully set forth herein.

TECHNICAL FIELD

The present invention relates to a method and an apparatus for providing an intelligence-oriented service using context information estimation in a mobile terminal. More particularly, the present invention relates to a method and an apparatus for providing an intelligence-oriented service using a software platform that estimates various context information from various data stored in a mobile terminal.

BACKGROUND ART

Today, a mobile terminal has become a center of ubiquitous networking and plays an important role more and more. Due to digital convergence, the mobile terminal mounts various additional apparatuses such as a camera, a Motion Picture Expert Group Audio Layer-3 (MP3) player, a Global Positional System (GPS) receiver, and an accelerator, etc. Accordingly, the mobile terminal is not a simple means of voice communication between individuals but evolves as a personal information apparatus providing various information and a multimedia service.

Recently, a desire of users who intend to receive a service suitable for a time and a place through the mobile terminal increases. Therefore, a study for providing a context recognition-based intelligent and personal service in the mobile terminal is in progress. Generally, the context recognition-based intelligent and personal service recognizes a user's current context and selectively provides corresponding information and service with a purpose of minimizing a user's direct intervention.

However, the conventional context recognition-based intelligent and personal service requires a separate hardware sensor or recognizes a context and then simply transfers and utilizes the recognized context at most.

That is, the conventional service does not mention a software platform required for estimating context information such as a user's current state, social relation, etc. from use history stored in a mobile terminal.

DISCLOSURE OF INVENTION

Solution to Problem

An aspect of the present invention is to address at least the above-mentioned problems and/or disadvantages and to provide at least the advantages described below. Accordingly, an aspect of the present invention is to provide a method and an apparatus for providing an intelligence-oriented service using context information estimation in a mobile terminal.

Another aspect of the present invention is to provide a method and an apparatus for providing an intelligence-oriented service using a software platform that estimates various context information from various data stored in a mobile terminal.

Another aspect of the present invention is to provide a method and an apparatus for operating a software platform that estimates various context information from various data to generate data for an intelligence service.

In accordance with an aspect of the present invention, a method for providing an intelligence-oriented service using context information estimation in a mobile terminal is provided. The method includes registering a correlation relation between a low level context variable and a high level context variable, obtaining the low level context variable from at least one data stored in the mobile terminal, generating the high level context variable using at least one low level context variable, and providing the high level context variable to an upper application.

In accordance with another aspect of the present invention, an apparatus for providing an intelligence-oriented service using context information estimation in a mobile terminal is provided. The apparatus includes a context widget manager for obtaining a low level context variable from at least one data stored in the mobile terminal, and a context manager for registering a correlation relation between a low level context variable and a high level context variable, generating the high level context variable using at least one low level context variable, and providing the generated high level context variable to an upper application.

Other aspects, advantages and salient features of the invention will become apparent to those skilled in the an from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for providing an intelligence-based service using a software platform that estimates various context information from various data stored in a mobile terminal. In the following description, the context information is estimated from various data stored in the mobile terminal and used as input data of the software platform. In addition, the context information used as the input data of the software platform is referred to as a Low-level Context Variable (LCV), and data generated using the LCV at the software platform is referred to as a High-level Context Variable (HCV).

Figure 1:
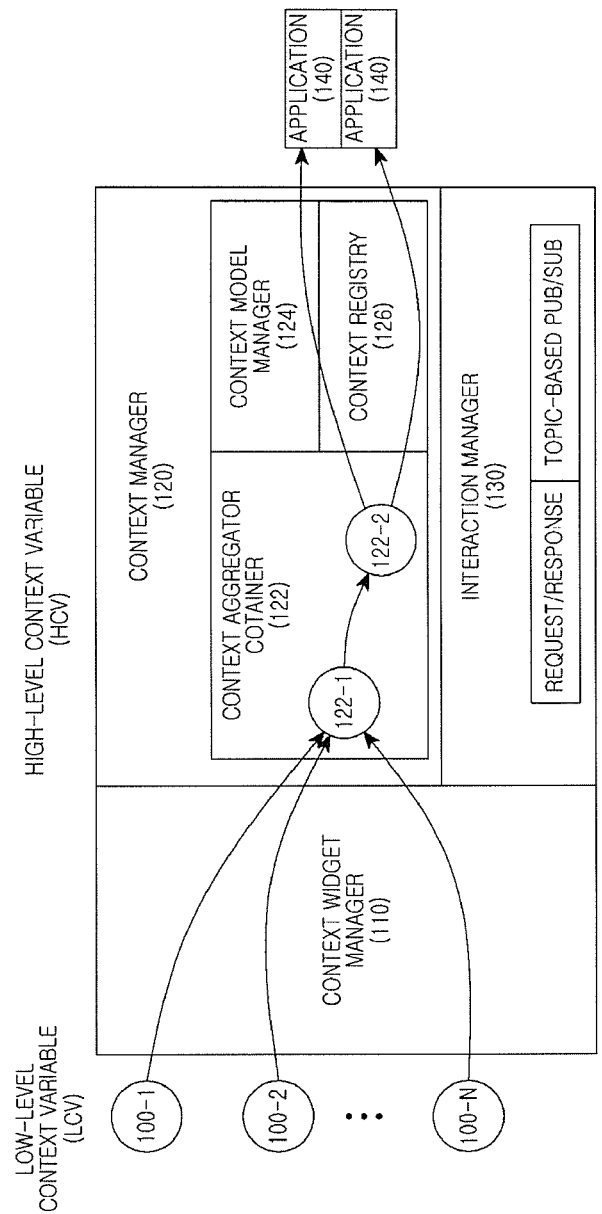
FIG. 1 is a block diagram illustrating a software platform that estimates context information in a mobile terminal according to an exemplary embodiment of the present invention.

FIG. 1 is a block diagram illustrating a software platform that estimates context information in a mobile terminal according to an exemplary embodiment of the present invention.

Referring to FIG. 1, the software platform that estimates context information in the mobile terminal includes a context widget manager 110, a context manager 120, and an interaction manager 130. The context manager 120 includes a context aggregator container 122, a context model manager 124, and a context registry 126.

The context widget manager 110 obtains various data 100-1 to 100-3 required for estimating context information from the outside of the software platform and converts the data into an LCV. That is, the context widget manager 110 detects whether the various data 100-1 to 100-3 stored in the mobile terminal change (for example, addition, deletion, update, etc.), and converts the data whose change has been detected into an LCV and transfers the same to the interaction manager 130. At this point, the context widget manager 110 may detect whether data changes for only data defined in advance, and may detect whether data changes for data defined in advance and all undefined data. At this point, the data not defined in advance are managed by the context model manager 124.

The context manager 120 generates an HCV from an LCV according to a predetermined rule and provides the same to an upper application 140 by including the context aggregator container 122, the context model manager 124, and the context registry 126.

The context aggregator container 122 includes a plurality of aggregators 122-1 and 122-2 according to a predetermined rule, generates an HCV from LCVs through the aggregators 122-1 and 122-2, and stores and manages the LCVs and the HCV. Here, each of the aggregators 122-1 and 122-2 generates an HCV clearly expressing meaning of a context change included in a change of an LCV, and is driven in response to a change of a corresponding LCV. That is, each of the aggregators 122-1 and 122-2 may test all corresponding LCVs to generate an HCV, and may test only LCVs related to changed context information according to an RETE algorithm optimize technique. That is, a change of an LCV is published as an event, and only aggregators 122-1 and 122-2 corresponding to the changed LCVs are driven, so that an HCV may be generated. At this point, the respective aggregators 122-1 and 122-2 are not driven when a specific condition is not met even though an LCV changes, and may be driven only if the specific condition is met, and may be driven according to a request of an application 140.

In addition, each of the aggregators 122-1 and 122-2 may generate a different HCV using an arbitrary HCV generated from the LCV. For this purpose, each of the aggregators 122-1 and 122-2 may receive results of lower aggregators through a Pub/Sub method. For example, as illustrated in FIG. 2, an aggregator 1 214 included in an aggregator container 210 receives an HCV generated from an aggregator a1 212 or aggregator a2 218 to generate a different HCV.

Figure 2:
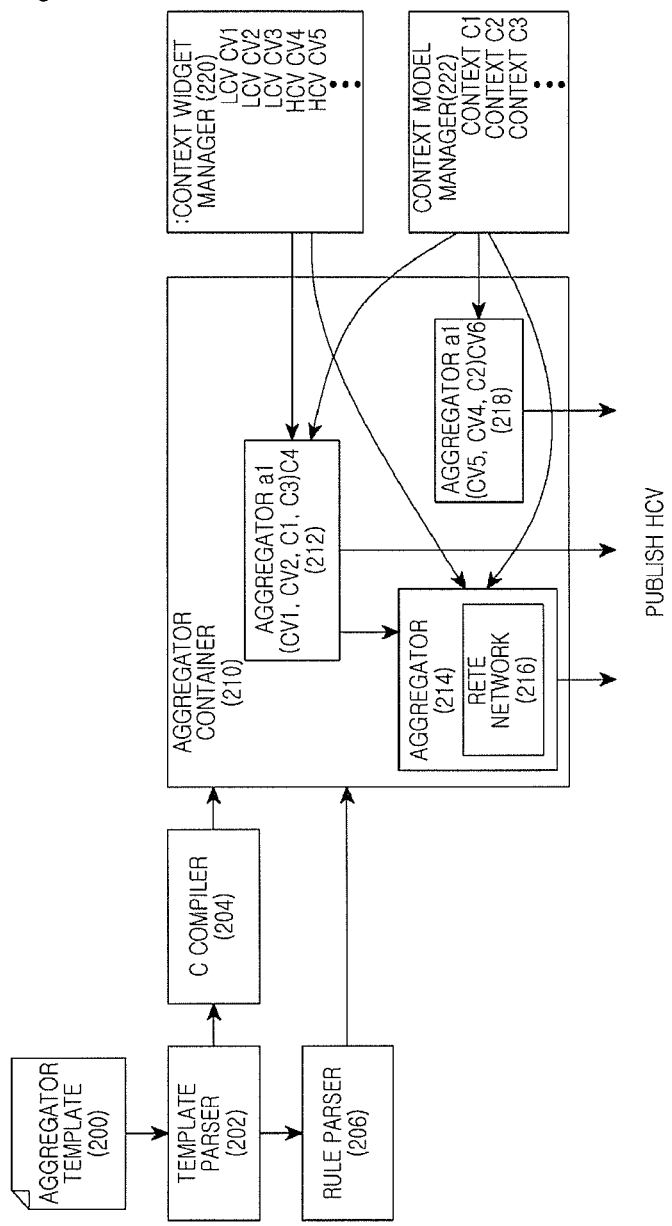
FIG. 2 is a view illustrating an aggregator container of a software platform in a mobile terminal according to an exemplary embodiment of the present invention.

In addition, as illustrated in FIG. 2, the context aggregator container 122 configures and registers an aggregator according to a rule parsed at a C compiler 204 or a rule parser 206 through a template parser 202. That is, a rule written using C codes or an eXtensible Markup Language (XML) through metadata and an aggregator template 200 by a developer is parsed at the template parser 202. In the case where the rule is written using C codes as a result of parsing at the template parser 202, the rule is parsed through the C compiler 204. In the case where the rule is written using the XML, the rule is parsed through the rule parser 206. Here, the rule written using the C codes, that is, the aggregator algorithm is registered as a binary through the C compiler 204. An aggregator algorithm written using XML may be parsed by the rule parser 206 and registered in the RETE network 216. At this point, the binary is registered during a building process, and the rule may be dynamically registered during initialization or execution of the context software platform. In addition, the context aggregator container 122 registers and stores a relation between an LCV and an HCV in the context model manager 124 and the context registry 126 according to the parsed rule.

The context model manager 124 stores a query method for all contexts used in all the aggregators 122-1 and 122-2 included in the context aggregator container 122, and provide a query function of the LCV and a query function of the HCV. That is, the context model manager 124 determines an LCV clearly expressed as an input through the aggregator template 200 by a developer to access the context widget manager 110 or an arbitrary aggregator 122-1 and 122-2 while a corresponding aggregator 122-1 and 122-2 is driven, and provide the LCV clearly expressed as the input to the corresponding aggregator 122-1 and 122-2. That is, the context model manager 124 provides a method of transferring a context change event for respective context variables through Pub/Sub and a method that allows the respective aggregators to query context information when needed.

The context registry 126 manages dependency between the LCV and the HCV. That is, the context registry 126 tests whether an LCV required for generating an arbitrary HCV or a different HCV is available. When the LCV or the different HCV is not available, the context registry 126 prevents a malfunction by stopping generation of the arbitrary HCV. Here, for management of the dependency, a relation between an LCV and an HCV is registered in the context registry 126 in advance. The context registry 126 performs a search function through this relation. The context registry 126 allocates an IDentifier (ID) to an LCV and an HCV for each topic. At this point, subjects published by the LCV and the HCV will be unique. Here, the context registry 126 allocates IDs to the LCV and the HCV to provide a method that allows the context model manager 124 to query an arbitrary LCV or HCV using the ID as a key.

The interaction manager 130 obtains an LCV for generating an HCV through the context widget manager 110 to provide the same to the context manager 120 under control of the context manager 120. Here, the interaction manager 130 may obtain an LCV using a Request/Response technique or a Publish/Subscribe technique. At this point, the interaction manager 130 performs a Publish/Subscribe technique based on topic to obtain an LCV. That is, the interaction manager 130 may obtain an arbitrary LCV by transmitting a request for obtaining the arbitrary LCV to the context widget manager 110 and receiving a response according to a need of the context manager 120, and may obtain a changed value when a published arbitrary LCV changes by publishing an arbitrary LCV as an event.

Figure 3:
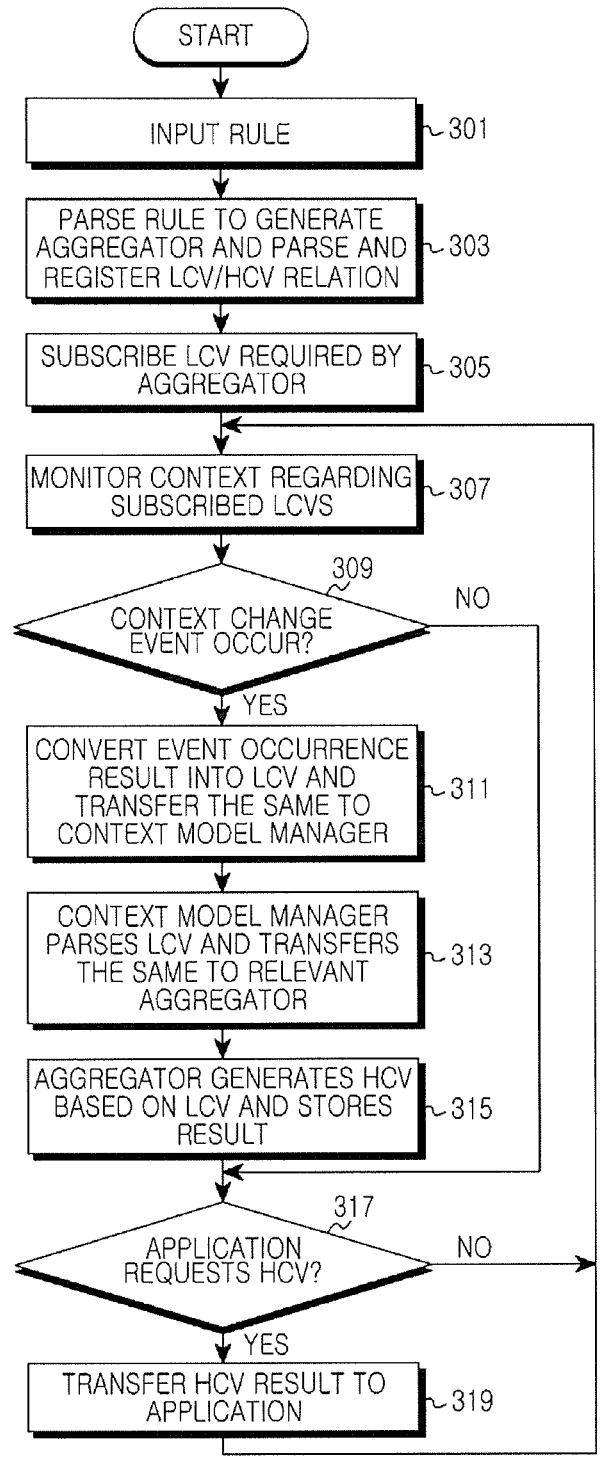
FIG. 3 is a flowchart illustrating an operation procedure for estimating context information through a software platform to provide an intelligence-oriented service in a mobile terminal according to an exemplary embodiment of the present invention.

FIG. 3 is a flowchart illustrating an operation procedure for estimating context information through a software platform to provide an intelligence-oriented service in a mobile terminal according to an exemplary embodiment of the present invention. Here, description is made on the assumption that a rule is input using an XML through the aggregator template 200, and is applicable to a case where the rule is input using C codes.

Referring to FIG. 3, when a rule written using an XML is input through the aggregator template 200 in step 301, the mobile terminal parses the rule through the rule parser 206 to generate an aggregator, and parses a relation between an LCV and an HCV to register the same in the context registry 126 and the context model manager 124 in step 303. Here, the context registry 126 manages dependency between the LCV and the HCV. When the LCV is not available, the context registry 126 may prevent the mobile terminal from malfunctioning by stopping generation of the HCV.

The mobile terminal subscribes the LCV requested by the generated aggregator in step 305, and monitors a context for the subscribed LCVs in step 307.

The mobile terminal tests whether an event in which the monitored context changes occur in step 309. At this point, when the event in which the context changes does not occur, the mobile terminal proceeds to step 317. When the event in which the context changes occurs, the mobile terminal proceeds to step 311 to convert the event occur result to an LCV through the context widget manager 110 and transfers the same to the context model manager 124. At this point, the LCV is transferred to the context model manager 124 through the interaction manager 130.

The mobile terminal parses the LCV through the context model manager 124 to transfer the same to a corresponding aggregator in step 313, and generates an HCV based on the LCV through the aggregator and stores a result thereof.

The mobile terminal tests whether an HCV is requested by an application. When the HCV is not requested, the mobile terminal returns to step 307. In contrast, when the HCV is requested, the mobile terminal transfers the generated HCV to the application in step 319, and returns to step 307 to re-perform subsequent steps.

FIG. 3 has been described using the case where an aggregator requires only an LCV as an input as an example. In the case where the aggregator requires an LCV and an arbitrary HCV as inputs, when an arbitrary aggregator for generating the arbitrary HCV is driven, a different HCV may be generated by obtaining the arbitrary HCV from the arbitrary aggregator.

In addition, though the case where an application requests an HCV has been explained in the above description, when an LCV used as an input in the aggregator changes and an HCV is generated, the generated HCV may be provided to the application even when the application's request does not exist.

According to exemplary embodiments of the present invention, input/output of an LCV is defined as topic of Pub/Sub, so that an additional LCV such as a sensor that recognizes an environment and a mobile Internet server may be integrated and extended.

A mobile terminal according to exemplary embodiments of the present invention may estimate context information even without mounting an additional sensor by providing an intelligence-oriented service using a software platform that estimates various context information from various data. Developers may mount and integrate various context information estimate techniques using the software platform to easily establish an intelligence-oriented service.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A method to provide an intelligence-oriented service using context information estimation in a mobile terminal, the method comprising:
   registering a correlation relation between first context information used as an input data of a software platform and second context information generated using the first context information at the software platform;
   obtaining the first context information from at least one datum stored in the mobile terminal;
   generating, based on the correlation relation, the second context information using at least one first context information; and
   providing the second context information to an upper application,
   wherein generating the second context information comprises:
      determining, based on the correlation relation, whether information required to generate the second context information is available, wherein the information required to generate the second context information comprises at least one of the first context information or other second context information; and
      stopping the generation of the second context information if the information required to generate the second context information is not available.

2. The method of claim 1, wherein the first context information is obtained through at least one of a Request/Response technique or a Publish/Subscribe technique.

3. The method of claim 1, wherein the correlation relation between the first context information and the second context information is registered through at least one of a C code or an eXtensible Markup Language (XML).

4. The method of claim 1, further comprising configuring an aggregator to generate the second context information using the at least one first context information according to the correlation relation.

5. The method of claim 4, wherein the aggregator operates after the information required to generate the second context information changes.

6. The method of claim 4, wherein the aggregator operates after the application requests the second context information.

7. The method of claim 1, wherein the first context information and the second context information are allocated IDentifiers (ID) for topics and are registered.

8. A mobile terminal configured to provide an intelligence-oriented service using context information estimation, the mobile terminal comprising:
at least one processing device configured to:
register a correlation relation between first context information used as an input data of a software platform and second context information generated using the first context information at the software platform;
obtain the first context information from at least one datum stored in the mobile terminal;
generate, based on the correlation relation, the second context information using at least one first context information; and
provide the generated second context information to an upper application,
wherein the at least one processing device is further configured to determine, based on the correlation relation, whether information required to generate the second context information is available, wherein the information required to generate the second context information comprises at least one of the first context information or other second context information, and
stop the generation of the second context information if the information required to generate the second context information is not available.

9. The mobile terminal of claim 8, wherein the at least one processing device is further configured to obtain the first context information through at least one of a Request/Response technique or a Publish/Subscribe technique.

10. The mobile terminal of claim 8, further comprising:
a C compiler configured to parse a C code; and
a rule parser configured to parse an eXtensible Markup Language (XML), wherein the correlation relation between the first context information and the second context information is registered through at least one of the C code or the XML.

11. The mobile terminal of claim 8, wherein the at least one processing device is further configured to configure an aggregator to generate the second context information using the at least one first context information according to the correlation relation.

12. The mobile terminal of claim 11, wherein the at least one processing device is further configured to operate after the information required to generate the second context information changes.

13. The mobile terminal of claim 11, wherein the at least one processing device is further configured to operate after the application requests second context information.

14. The mobile terminal of claim 11, wherein the at least one processing device is further configured to allocate IDentifiers (ID) to the first context information and the second context information for topics and register the first context information and the second context information for each of the topics.

15. A non-transitory computer readable medium embodying a computer program to provide an intelligence-oriented service using context information estimation in a mobile terminal, the computer program comprising program code to:
register a correlation relation between first context information used as input data of a software platform and second context information generated using the first context information at the software platform;
obtain the first context information from at least one datum change stored in the mobile terminal;
generate, based on the correlation relation, the second context information using at least one first context information; and
provide the first context information to an upper application,
wherein the computer program further comprises program code to:
determine, based on the correlation relation, whether information required to generate the second context information is available, wherein the information required to generate the second context information comprises at least one of the first context information or other second context information; and
stop the generation of the second context information if the information required to generate the second context information is not available.

16. The computer readable medium of claim 15, wherein the first context information is obtained through at least one of a Request/Response technique or a Publish/Subscribe technique.

17. The computer readable medium of claim 15, wherein the correlation relation between the first context information and the second context information is registered through at least one of a C code or an eXtensible Markup Language (XML).

* * * * *